(12) United States Patent
Takedomi et al.

(10) Patent No.: US 10,700,585 B2
(45) Date of Patent: Jun. 30, 2020

(54) LINEAR MOTOR

(71) Applicant: Hitachi Metals, Ltd., Tokyo (JP)

(72) Inventors: Seiki Takedomi, Takasaki (JP); Osamu Kakutani, Musashimurayama (JP); Yoshitaka Takagi, Musashimurayama (JP)

(73) Assignee: Hitachi Metals, Ltd., Tokyo (JP)

( * ) Notice: Subject to any disclaimer, the term of this patent is extended or adjusted under 35 U.S.C. 154(b) by 362 days.

(21) Appl. No.: 15/560,431

(22) PCT Filed: Mar. 30, 2016

(86) PCT No.: PCT/JP2016/060288
§ 371 (c)(1),
(2) Date: Sep. 21, 2017

(87) PCT Pub. No.: WO2016/159034
PCT Pub. Date: Oct. 6, 2016

(65) Prior Publication Data
US 2018/0069464 A1 Mar. 8, 2018

(30) Foreign Application Priority Data
Mar. 31, 2015 (JP) ................................. 2015-072491

(51) Int. Cl.
*H02K 41/03* (2006.01)
*H02K 1/14* (2006.01)

(52) U.S. Cl.
CPC ......... *H02K 41/033* (2013.01); *H02K 41/031* (2013.01); *H02K 1/14* (2013.01)

(58) Field of Classification Search
CPC ....... H02K 1/14; H02K 41/031; H02K 41/033
(Continued)

(56) References Cited

U.S. PATENT DOCUMENTS 6,791,214 B2   9/2004 Korenaga
2005/0134122 A1*  6/2005 Uchida ............... G03F 7/70758
                                                      310/12.25
(Continued)

FOREIGN PATENT DOCUMENTS

CN   101083425 A   12/2007
DE   102006013582 A1   9/2007
(Continued)

OTHER PUBLICATIONS

English Translation of International Search Report for PCT/JP2016/060288 dated Jun. 21, 2016, 2 pages.
(Continued)

*Primary Examiner* — Shawki S Ismail
*Assistant Examiner* — Monica Mata
(74) *Attorney, Agent, or Firm* — Peter W. Schroen; Bret E. Field; Bozicevic, Field & Francis LLP

(57) ABSTRACT

The linear motor includes a stator and a mover. The stator includes: a board part having a rectangular plate shape, a plurality of magnetic pole teeth which are juxtaposing to each other on the board part and around each of which a coil is wound, and an auxiliary tooth which is arranged in an end part of the board part in a juxtaposed direction in a manner of being separate from the magnetic pole teeth and around which a coil is not wound. The mover includes: a plurality of magnets whose tip surfaces face the stator, and a back yoke having a rectangular plate shape in which the plurality of magnets are aligned in a straight line such that magnetic poles are alternately formed.

2 Claims, 8 Drawing Sheets

(58) Field of Classification Search
USPC .................................................. 310/12.25
See application file for complete search history.

(56) References Cited

U.S. PATENT DOCUMENTS

2009/0256428 A1  10/2009  Jajtic et al.
2011/0221284 A1  9/2011  Kakihara et al.

FOREIGN PATENT DOCUMENTS

| | | |
|---|---|---|
| EP | 1863155 A2 | 12/2007 |
| JP | S55-68871 A | 5/1980 |
| JP | H10-257750 A | 9/1998 |
| JP | 2005-151753 A | 6/2005 |
| JP | 2008-125322 A | 5/2008 |
| JP | 2009-545940 A | 12/2009 |
| JP | 2011-188709 A | 9/2011 |
| TW | I244253 B | 11/2005 |
| TW | 201440391 A | 10/2014 |
| WO | WO2012176236 A1 | 12/2012 |

OTHER PUBLICATIONS

Office Action for Taiwan application No. 105109989 dated Feb. 7, 2017, 5 pages, and its English translation, 3 pages.
First Office Action for Chinese Application No. 201680020798.3 dated Dec. 4, 2018, 6 pages.

* cited by examiner

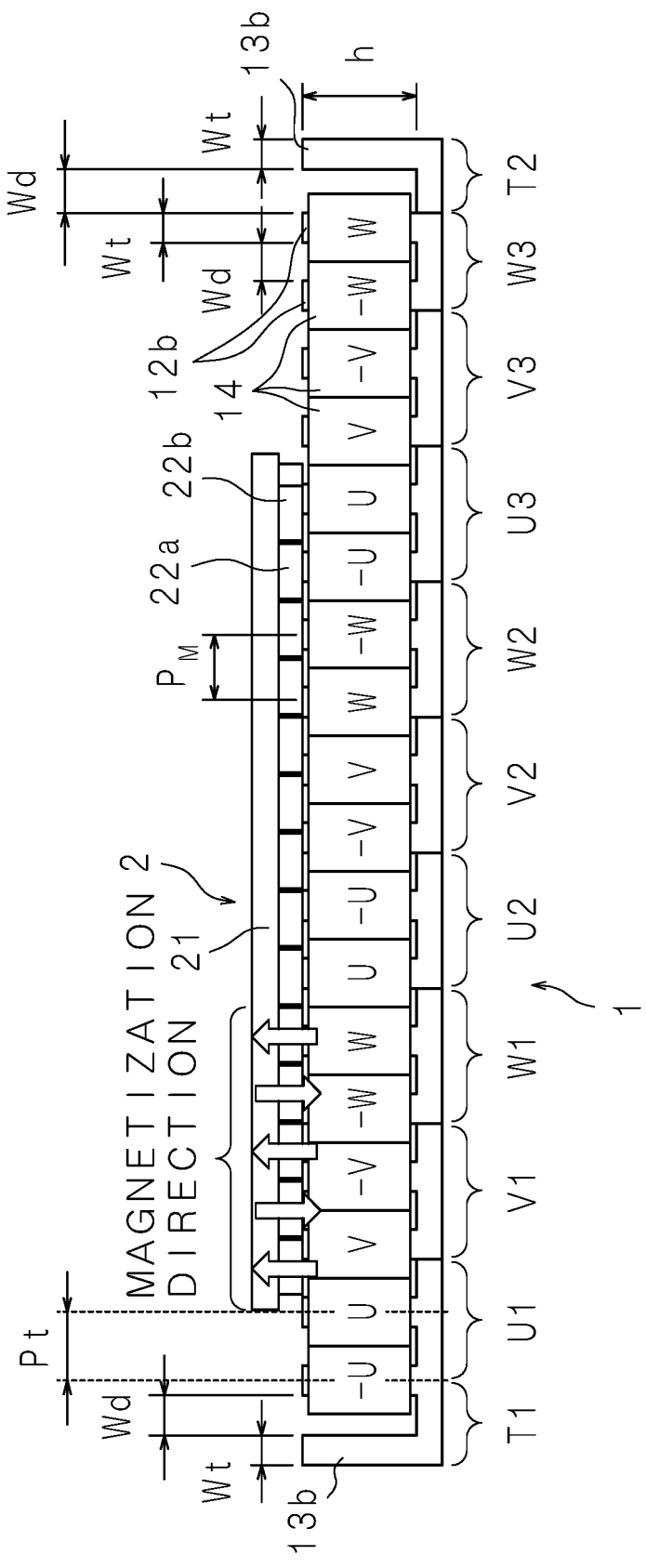

LINEAR MOTOR

CROSS-REFERENCE TO RELATED APPLICATIONS

This application is the national phase under 35 U.S.C. § 371 of PCT International Application No. PCT/JP2016/060288 which has an International filing date of Mar. 30, 2016 and designated the United States of America.

FIELD

The present invention relates to an armature for linear motor and a linear motor employing the same armature.

BACKGROUND

In semiconductor fabrication apparatuses and liquid crystal display substrate fabrication apparatus, a workpiece is required to be moved in a plane perpendicular to the gravity direction with precision and low vibration. A table carrying a workpiece or a working tool is moved by a driving source allowed to move individually on linear guides arranged orthogonally to each other. Precision and low vibration are required in this movement. Thus, the driving source does not employ a method that the output of a rotary motor is converted into linear motion by a ball screw, which is employed in common process machinery. Instead, a linear motor allowed to directly generate parallel displacement is employed as the driving source.

A general configuration of a linear motor includes: a field magneton part in which a plurality of permanent magnets are arranged such that the polarities vary alternately and which serves as a mover (or a stator); and an armature which is provided with a core constructed from a soft magnetic material including a plurality of magnetic pole teeth and with coils wound around the individual magnetic pole teeth and which serves as a stator (or a mover). The field magneton part and the armature are arranged opposite to each other with a given distance in between. When an alternating current whose polarity and magnitude are synchronous with the change cycle of a magnetic field relative to the moving distance of the field magneton part is applied to the coils, attractive and repulsive forces relative to the permanent magnets generate a thrust force in the moving direction. Thus, the field magneton part (or the armature) performs linear motion relative to the armature (or the field magneton part). Various types of linear motors having such a configuration have been proposed. For example, Japanese Patent Application Laid-Open No. 2008-125322 discloses a linear motor in which the field magneton part serves as a stator and the armature serves as a mover.

SUMMARY

On the other hand, in a movable-magnet type linear motor in which the armature serves as a stator and the field magneton part serves as a mover, the effective stroke (the length of the movable range) of the mover is shorter than or equal to a value obtained by subtracting the overall length of the mover from the overall length of the stator. In such a linear motor, when the effective stroke is desired to be extended, the overall length of the mover is required to be reduced or, alternatively, the overall length of the stator is required to be extended. However, when the stator is to be extended, the length is not allowed to be arbitrarily extended. This is because in order that the characteristics of the linear motor may be maintained, the extension is required to be performed on a given-unit basis. For example, in the case of a moveable-magnet type linear motor having a 7-pole 6-slot configuration, extension of the stator is required to be performed by the unit of 6 slots.

Further, even when extension is to be performed on a given-unit basis, in order that the extension by the unit of a shorter distance may be allowed, a design is required in advance in which the pitch of the magnets and the pitch of the coils are defined into smaller values. This causes an increase in the number of components and the number of process steps.

Thus, demands are present that extension of the effective stroke is allowed to be achieved without a requirement that extension of the stator (the armature) is performed on a slot-unit basis.

The present disclosure has been devised in view of the above-described situations. An object thereof is to provide an armature for linear motor and the like in which the effective stroke is allowed to be extended without a requirement of increasing the number of slots.

The armature for linear motor according to a first of the present disclosure includes: a board part having a rectangular plate shape; a plurality of magnetic pole teeth which are juxtaposing to each other on the board part and around each of which a coil is wound; and an auxiliary tooth which is arranged in an end part of the board part in a juxtaposed direction in a manner of being separate from the magnetic pole teeth and around which a coil is not wound.

In a first aspect of the present disclosure, the auxiliary tooth around which a coil is not wound is provided in an end part. Thus, when the armature is extended by an amount corresponding to the provision of the auxiliary teeth, the effective stroke of the linear motor is allowed to be extended.

The armature for linear motor according to a second of the present disclosure is characterized in that an interval between the auxiliary tooth and the magnetic pole tooth adjacent the auxiliary tooth is substantially the same as an interval between adjacent two of the magnetic pole teeth.

In a second of the present disclosure, a decrease in the thrust force is allowed to be remarkably suppressed in a portion where the effective stroke has been extended.

The armature for linear motor according to a third of the present disclosure is characterized in that the auxiliary tooth has substantially the same shape as the magnetic pole tooth.

In a third of the present disclosure, since the auxiliary tooth has substantially the same shape as the magnetic pole tooth, these teeth are allowed to be constructed from common components and hence the number of components is allowed to be reduced.

The armature for linear motor according to a fourth of the present disclosure is characterized in that the auxiliary tooth and the magnetic pole tooth individually have a rectangular parallelepiped shape and that the auxiliary tooth and the magnetic pole tooth adjacent to the auxiliary tooth are directly facing each other in the juxtaposed direction.

In a fourth of the present disclosure, the auxiliary tooth has a similar shape to the magnetic pole tooth and hence is allowed to contribute to generation of the thrust force.

The armature for linear motor according to a fifth of the present disclosure is characterized in that in each of the auxiliary tooth and the magnetic pole tooth, the tip part is larger than the pedestal part and that the auxiliary tooth and the magnetic pole tooth adjacent to the auxiliary tooth are directly facing each other in the direction of parallel arrangement.

In a fifth of the present disclosure, since the tip part is larger than the pedestal part in each of the auxiliary tooth and the magnetic pole tooth, the magnetic flux transmission efficiency is allowed to be improved.

The armature for linear motor according to a sixth of the present disclosure is characterized in that the tip surfaces of the auxiliary tooth and the magnetic pole tooth are flush with each other.

In a sixth of the present disclosure, the auxiliary tooth has a tip surface which is flush with the tip surface of the magnetic pole tooth and hence is allowed to pass a magnetic flux to the stator similarly to the magnetic pole tooth.

The armature for linear motor according to a seventh of the present disclosure is characterized in that the auxiliary tooth is provided in each of both end parts in the juxtaposed direction.

In a seventh of the present disclosure, since the auxiliary tooth is provided in both end parts in the juxtaposed direction the magnetic pole teeth, the effective stroke is allowed to be extended without degradation in the characteristics of the linear motor.

The linear motor according to an eighth of the present disclosure includes: an armature for linear motor described above; and a field magneton part provided with a plurality of magnets whose tip surfaces face the armature for linear motor and with a back yoke having a rectangular plate shape in which the plurality of magnets are aligned in a straight line such that magnetic poles are alternately formed.

In an eighth of the present disclosure, the auxiliary tooth around which a coil is not wound is provided in an end part. Thus, when the armature is extended by an amount corresponding to the provision of the auxiliary teeth, the effective stroke of the linear motor is allowed to be extended.

The linear motor according to an ninth of the present disclosure is characterized in that the armature for linear motor is constructed as a stator and the field magneton part is constructed as a mover.

In an ninth of the present disclosure, since the armature for linear motor is constructed as a stator and the field magneton part is constructed as a mover, the effective stroke of the mover is allowed to be extended.

In an aspect of the present disclosure, the effective stroke is allowed to be extended.

The above and further objects and features will more fully be apparent from the following detailed description with accompanying drawings.

BRIEF DESCRIPTION OF THE DRAWINGS

FIG. 4 is a side view of a linear motor;

DETAILED DESCRIPTION

Figure 1:
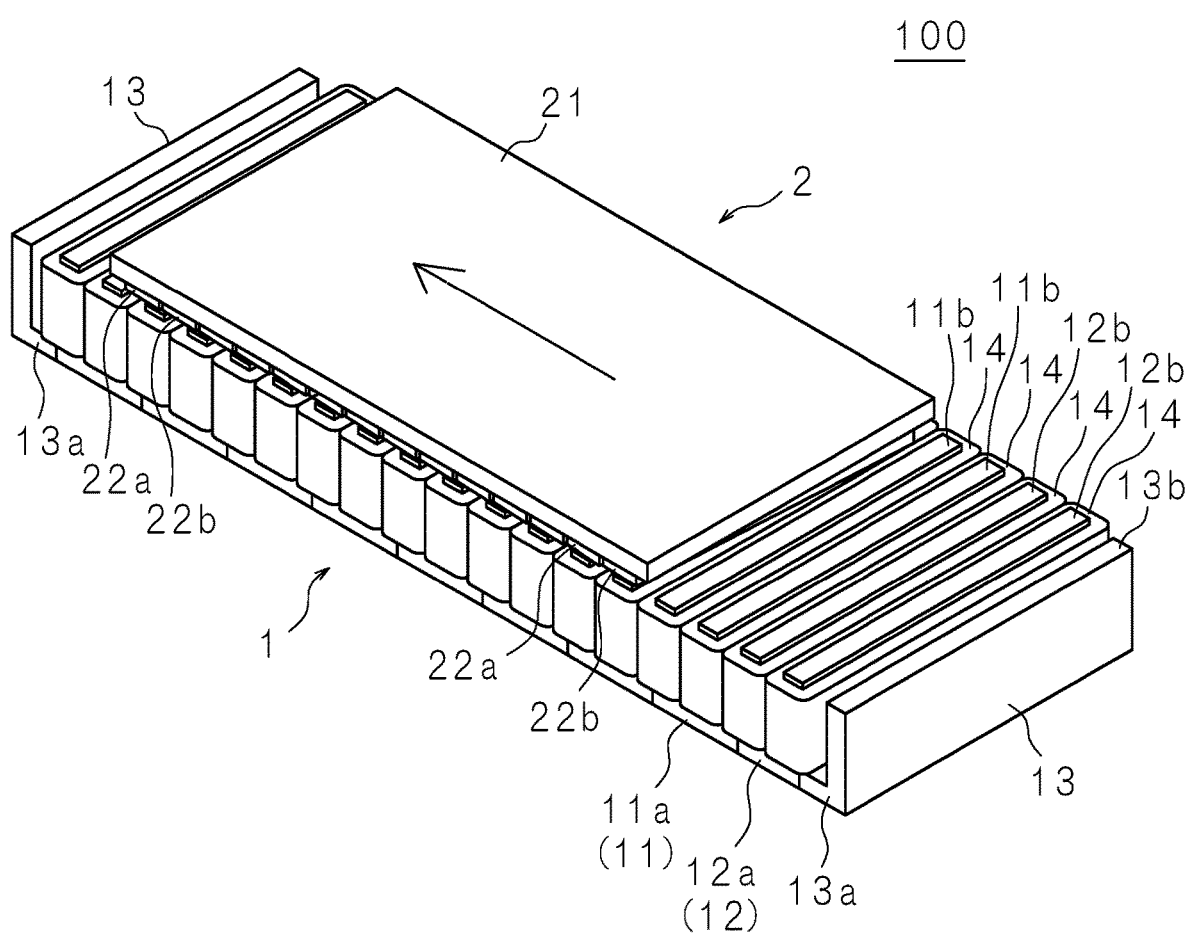
FIG. 1 is a perspective view illustrating an exemplary configuration of a linear motor.
Figure 2A:
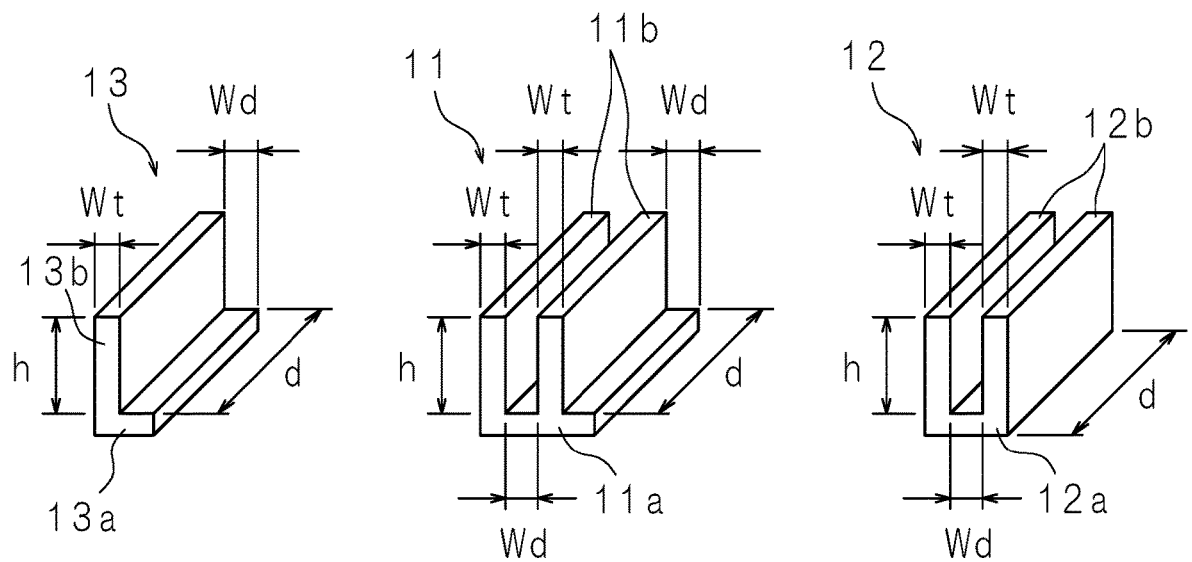
FIG. 2A is an explanation diagram illustrating a configuration of a stator without a coil.
Figure 2B:
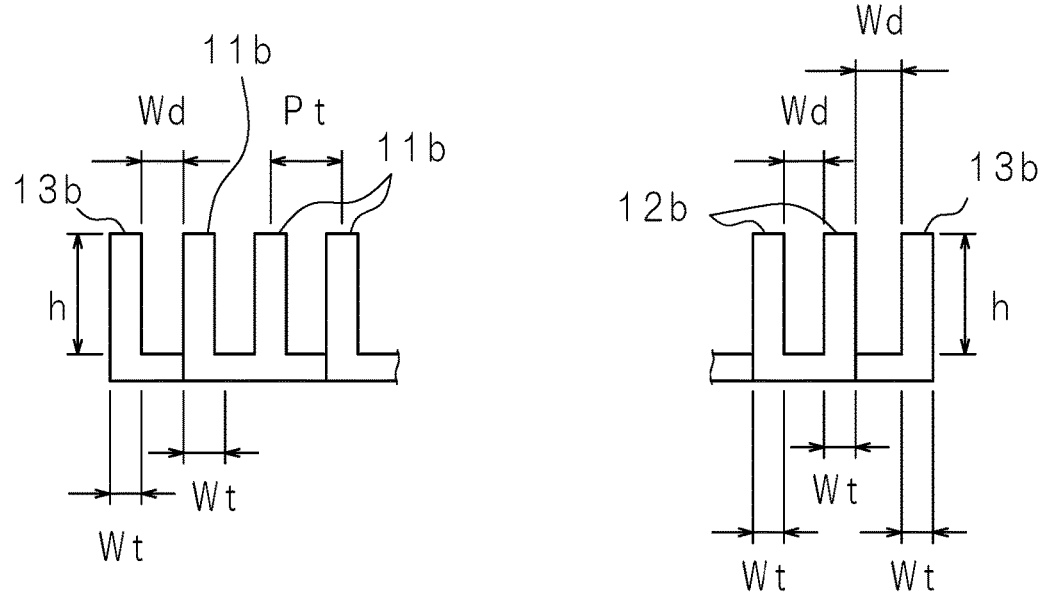
FIG. 2B is an explanation diagram illustrating a configuration of a stator without a coil.

Embodiments are described below in detail with reference to the drawings. FIG. 1 is a perspective view illustrating an exemplary configuration of a linear motor 100. FIGS. 2A and 2B are explanation diagrams illustrating a configuration of a stator 1 without a coil 14. FIG. 2A is a perspective view illustrating components constituting the stator 1. FIG. 2B is a side view of the stator 1. The linear motor 100 includes: a stator 1 having a rectangular parallelepiped shape elongated in one direction; and a mover 2 which faces a part of the stator 1 with a small interval in between and in which permanent magnets 22a and 22b are arranged in parallel to each other on a back yoke 21 having a rectangular plate shape. The mover 2 is constructed such as to move in the longitudinal direction of the stator 1 (in the arrow direction or in the direction opposite to the arrow in FIG. 1). In the linear motor 100 of the present embodiment, the armature is constructed as the stator 1 and the field magneton part is constructed as the mover 2.

The stator 1 includes magnetic pole tooth components 11 and 12 and auxiliary tooth components 13. As illustrated in FIG. 2A, the magnetic pole tooth component 11 includes: a board part 11a having a rectangular plate shape; and two tooth parts 11b each of which has a rectangular plate shape (a rectangular parallelepiped shape) and which rise perpendicularly from the board part 11a and face each other with a given distance in between. In side view, the magnetic pole tooth component 11 has substantially a shape obtained by linking two L-shapes together. In the magnetic pole tooth component 11, the dimension (Wt+Wd+Wt+Wd) in the moving direction of the mover 2 (the right and left directions in FIG. 2A) is set smaller than the dimension (d) in the direction (the depth direction of FIG. 2) intersecting it. The gap dimension (Wd) between the two tooth parts 11b in the parallel arrangement direction is set wider than the thickness of the tooth part 11b (the dimension Wt in the right and left directions in FIG. 2). The protrusion length (h) of the tooth part 11b is set larger than the gap dimension (Wd) and the thickness (Wt). The thickness of the board part 11a is the same as the thickness (Wt) of the tooth part 11b.

The magnetic pole tooth component 12 includes two tooth parts 12b each having a rectangular plate shape (a rectangular parallelepiped shape) and each rising perpendicularly from each end part of a board part 12a having a rectangular plate shape. In side view, the magnetic pole tooth component 12 has a U-shape. The magnetic pole tooth component 12 has a dimension Wt+Wd+Wt in the moving direction of the mover 2. In each tooth part 12b, the thickness is Wt and the protrusion length from the board part 12a is h. The depth dimension of the magnetic pole tooth component 12 is d. The thickness of the board part 12a is the same as the thickness (Wt) of the tooth part 12b.

The auxiliary tooth component 13 includes an auxiliary tooth part 13b having a rectangular plate shape (a rectangular parallelepiped shape) and rising perpendicularly from an end part of a board part 13a having a rectangular plate shape. In side view, the auxiliary tooth component 13 has an L-shape. The auxiliary tooth component 13 has a dimension Wt+Wd in the moving direction of the mover 2. The thickness of the auxiliary tooth part 13b is Wt and the protrusion length from the board part 13a is h. The depth dimension of the auxiliary tooth component 13 is d. The thickness of the board part 13a is the same as the thickness (Wt) of the auxiliary tooth part 13b. The auxiliary tooth part 13b has substantially the same shape as the tooth parts 11b and 12b.

In FIG. 1 the stator 1 includes eight magnetic pole tooth components 11, one magnetic pole tooth component 12, and two auxiliary tooth components 13. The stator 1 is constructed as follows. That is, the eight magnetic pole tooth components 11 are aligned and linked together such that adjacent tooth parts 11b are located at regular intervals (Wd). Then, the magnetic pole tooth component 12 is linked to one end of the linked module in the longitudinal direction, that is, linked to the side where the board part 11a protrudes in the moving direction of the mover 2, in a manner that the tooth part 12b becomes in parallel to the tooth part 11b.

Further, the stator 1 is constructed by fixing the auxiliary tooth component 13 to each of both end parts in the length direction and by linking together the tooth parts 11b and 12b. Then, the tooth parts 11b and 12b and the auxiliary tooth parts 13b are juxtaposing to each other at given intervals along the longitudinal direction of the stator 1 in a state that their tip surfaces are flush with each other. The auxiliary tooth part 13b is directly facing the adjacent tooth part 11b or 12b in the juxtaposed direction. Further, a lead wire is wound around each of the tooth parts 11b and 12b so that coils 14 and 14 each corresponding to each tooth part are formed. The diameter and the winding number of the lead wire are the same in each coil 14. When an electric current is supplied to the individually wound coils 14 and 14, the tooth parts 11b and 12b individually serve as magnetic pole teeth. For example, the magnetic pole tooth components 11 and 12 and the auxiliary tooth components 13 constituting the stator 1 are fabricated from a non-directional electromagnetic steel plate. Here, the auxiliary tooth part 13b corresponds to the above-described auxiliary tooth.

Figure 3:
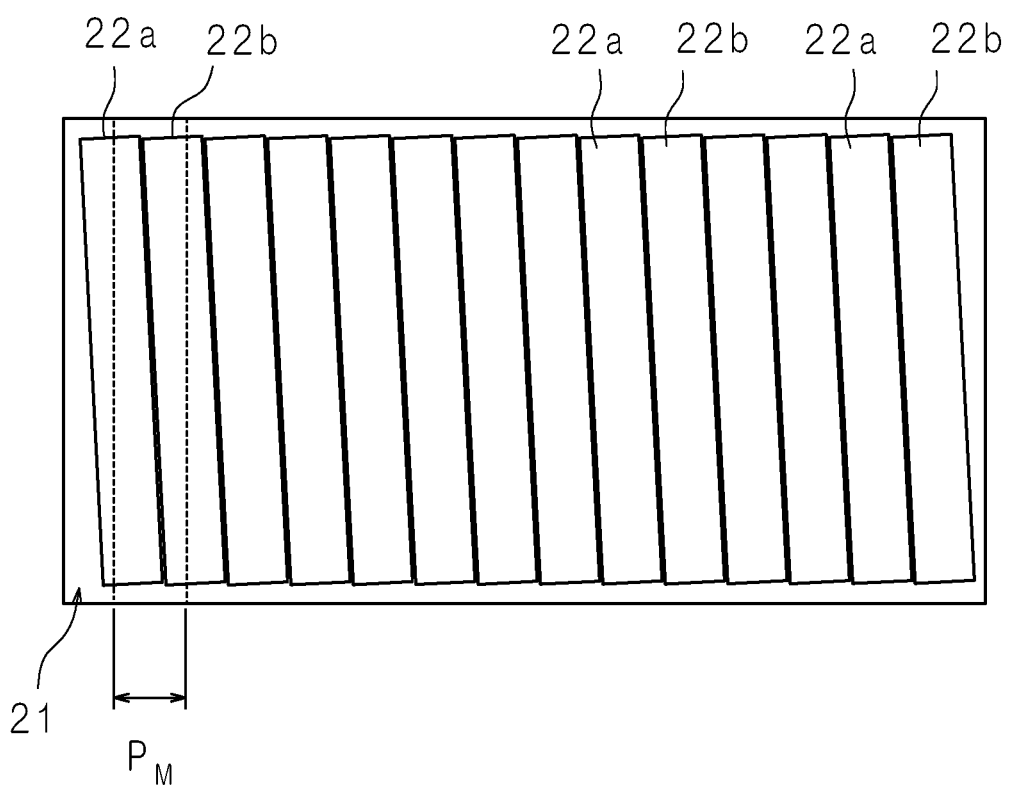
FIG. 3 is a plan view illustrating an exemplary configuration of a mover.

FIG. 3 is a plan view illustrating an exemplary configuration of the mover 2. FIG. 3 is a diagram illustrating the mover 2 viewed from the opposing face side of the stator 1. The mover 2 includes a plurality of permanent magnets 22a and 22b arranged (aligned) alternately in the moving direction on a back yoke 21 having a rectangular plate shape. The permanent magnets 22a and 22b are magnetized in the direction of facing the stator 1. The permanent magnets 22a and 22b have polarities opposite to each other. The center-to-center dimension of adjacent permanent magnets 22a and 22b (the pitch of the magnets) is denoted by $P_M$. The permanent magnets 22a and 22b are arranged (a skew arrangement) in a manner of being inclined at approximately 3 degrees relative to the moving direction. The back yoke 21 of the stator 1 is fabricated from a soft magnetism metal such as a rolled steel. The permanent magnets 22a and 22b are constructed from neodymium magnets, ferrite magnets, samarium cobalt magnets, or the like.

The stator 1 and the mover 2 having the above-described configurations are combined so that the linear motor 100 is constructed. FIG. 4 is a side view of the linear motor 100. The mover 2 faces the stator 1 in a manner that the permanent magnets 22a and 22b face the tip surfaces of the tooth parts 11b and 12b of the stator 1 with a given gap in between. The seven pairs of permanent magnets 22a (22b) provided in the mover 2 face the 6 pairs of tooth parts 11b (12b) provided in the stator 1. That is, the linear motor 100 has basically a 7-pole 6-slot configuration.

When a three-phase alternating current is supplied to the coils 14 of the stator 1 so that magnetic fields are generated in the tooth parts 11b (12b), the permanent magnets 22a and 22b of the mover 2 are magnetically attracted and repelled successively by the magnetic fields so that the mover 2 performs linear motion relative to the stator 1.

Next, the auxiliary tooth part 13b is described below. The auxiliary tooth part 13b is formed in each of both end parts of the stator 1 similarly to the tooth parts 11b (12b). That is, the thickness of the auxiliary tooth part 13b is Wt and the distance between adjacent tooth parts 11b (12b) is Wd.

The thickness Wt and the distance Wd are set forth as follows. The linear motor 100 has a 7-pole 6-slot configuration. Thus, when the pitch of the permanent magnets 22a and 22b is denoted by $P_M$, the pitch Pt of the tooth parts 11b (12b) of the stator 1 is obtained as Pt=$P_M$×7/6. Then, on the basis of the obtained Pt, the thickness Wt of the tooth part 11b (12b) is set forth with taking into consideration the winding thickness of the coil 14 wound around the tooth part 11b (12b). Then, on the basis of the thickness Wt having been set forth, the distance Wd between adjacent tooth parts 11b (12b) is set forth according to Wd=Pt−Wt. Here, as described later, when the skew of the permanent magnets 22a and 22b is taken into consideration, Wd=Pt1−Wt is employed.

Figure 5A:
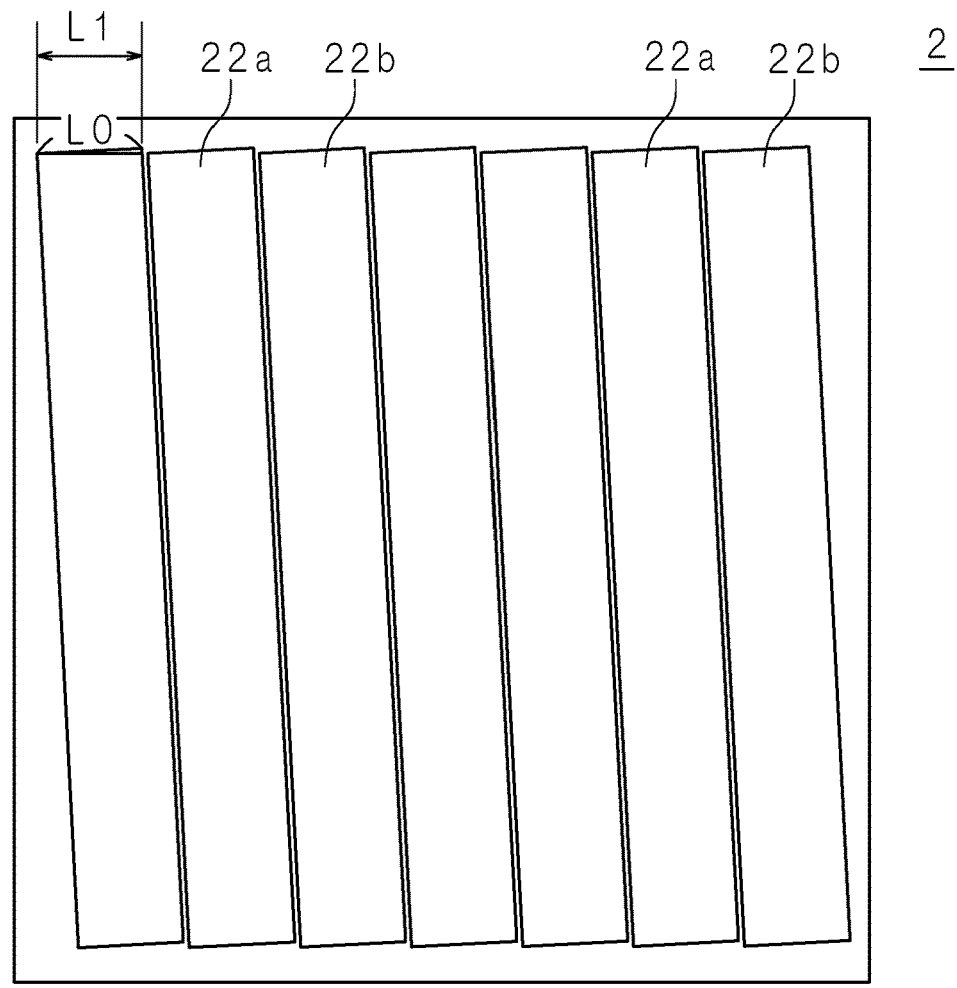
FIG. 5A is a plan view illustrating the entirety of a mover.
Figure 5B:
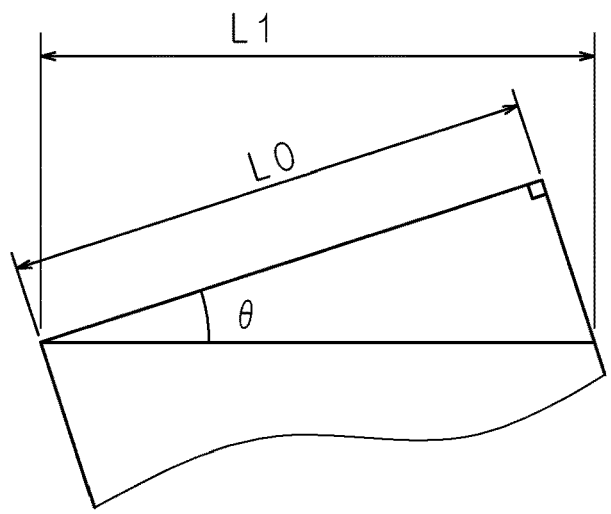
FIG. 5B is a plan view where a part of a mover is enlarged.

Next, the lengths of the stator 1 and the mover 2 in the linear motor 100 are described below. FIG. 5A is a plan view illustrating the entirety of the mover 2. FIG. 5B is a plan view where a part of the mover 2 is enlarged. FIGS. 5A and 5B are plan views illustrating an exemplary configuration of the mover 2. FIGS. 5A and 5B illustrate the mover 2 having a smallest 7-pole 6-slot configuration. Here, in FIG. 5B, a large value of θ is employed for the purpose of easy understanding. In each of FIGS. 5A and 5B, the right and left directions in the page correspond to the moving direction of the mover 2. The permanent magnets 22a and 22b provided in the mover 2 are arranged in a manner of being inclined by an angle θ. The permanent magnets 22a and 22b are inclined such that the inclination angle relative to the direction (the up and down directions in the page in FIG. 5) intersecting the moving direction of the mover 2 becomes equal to the angle θ. That is, a skew arrangement of angle θ is employed. The width of each of the permanent magnets 22a and 22b is denoted by L0. The length of each of the permanent magnets 22a and 22b in the moving direction is denoted by L1. Then, a relation between L1 and L0 is obtained as L1=L0/cos θ. Here, the permanent magnets 22a and 22b have individually the same dimensions. Thus, the length L1 of each of the permanent magnets 22a and 22b in the moving direction is equal to the pitch $P_M$. That is, L1=$P_M$.

Figure 6:
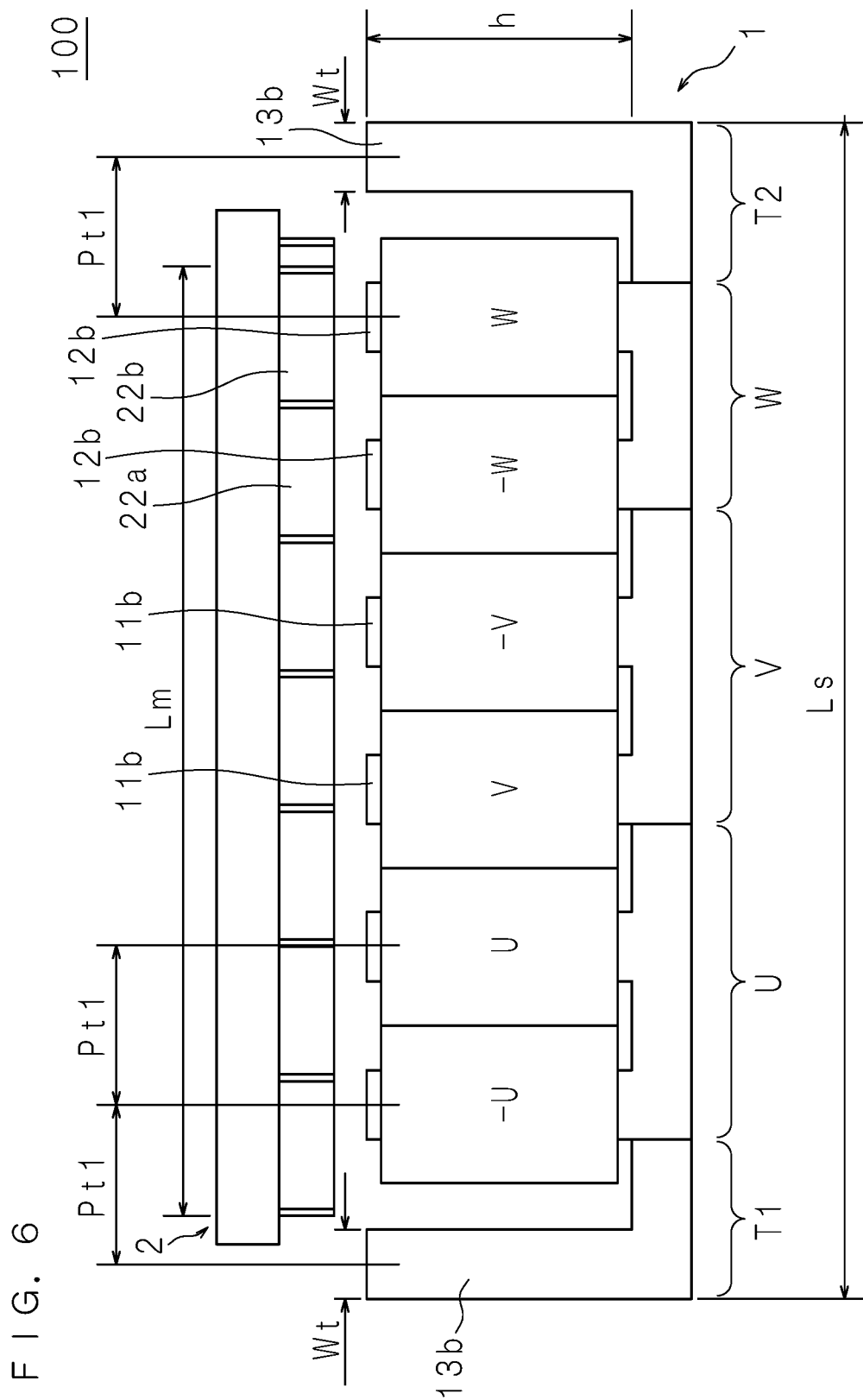
FIG. 6 is a side view of a linear motor.

FIG. 6 is a side view of the linear motor 100. FIG. 6 also illustrates the stator 1 having a smallest 7-pole 6-slot configuration. The above-described relation between Pt and $P_M$ is a relation of a case that the skew of the permanent magnets is not taken into consideration, that is, of a case that θ is 0 degree. When the permanent magnets are skew-arranged, the pitch of the permanent magnets increases. In correspondence to this increase, the pitch between the tooth parts is also changed. When the pitch corresponding to the skew of the tooth parts 11b and 12b and the auxiliary tooth parts 13b is denoted by Pt1, Pt1=Pt/cos θ is satisfied. The thickness of the auxiliary tooth part 13b is denoted by Wt. Then, the overall length Ls of the stator 1 along the moving direction of the mover 2 becomes Ls=Pt1×6+Pt1+Wt. Further, the mover 2 includes seven permanent magnets 22a and 22b in total. The overall length Lm of the magnet portion is Lm=L1×7=PM×7. Further, on the basis of the above-described relation between the pitches Pt and $P_M$, Lm=$P_M$×7=Pt1×6/7×7=Pt1×6 is obtained.

The description given above is summarized as follows. The width of each of the tooth parts 11b and 12b and the auxiliary tooth parts 13b is Wt. The pitch corresponding to the skew of the magnets of the tooth parts 11b and 12b and the auxiliary tooth parts 13b is Pt1. The overall length of the stator 1 is denoted by Ls. The overall length of the magnet portion of the mover 2 is denoted by Lm. Then, relations between these values are obtained as follows.

$$Ls = Pt1 \times 6 + Pt1 + Wt$$

$$Lm = Pt1 \times 6$$

$$Ls - Lm = Pt1 + Wt$$

Thus, in the linear motor 100 having a smallest 7-pole 6-slot configuration, the overall length Ls of the stator 1 becomes longer than the overall length Lm of the magnet portion of the mover 2 by Pt1+Wt or more.

In the linear motor 100 having a smallest 7-pole 6-slot configuration illustrated in FIG. 6, when the stroke is to be increased, the following method is employed. In a case that three-phase unbalanced energization is allowed in the control of the linear motor 100, addition may be performed by the unit of two slots of positive and reverse phases (e.g., the −U-phase and the U-phase) so that the stroke is allowed to be increased in a state that the motor characteristics are substantially maintained.

In a case that three-phase balanced energization is to be employed in the control of the linear motor 100, a pair of positive and reverse phases is required for each of the U-phase, the V-phase, and the W-phase. That is, addition is to be performed by the unit of 6 slots. Then, the stroke is allowed to be increased in a state that the motor characteristics are maintained.

Here, a 7-pole 6-slot configuration has been described so far. However, a similar situation holds also in a 14-pole 12-slot configuration obtained as twice the above-described configuration, a 21-pole 18-slot configuration obtained as threefold the above-described configuration, and a 7n-pole 6n-slot configuration obtained as n-fold the above-described configuration. Even when such an n-fold configuration is employed, the difference between Ls and Lm is equal to Pt1+Wt.

The linear motor 100 illustrated in FIG. 4 employs a 14-pole 12-slot configuration obtained as twice the 7-pole 6-slot configuration. Then, the number of slots of the stator 1 is increased by 6 slots into 18 slots.

Here, the linear motor of the present invention has a configuration constructed from seven poles of permanent magnets 22a and 22b (magnets) and six slots of tooth parts 11b and 12b (magnetic pole teeth) and is driven in this configuration.

When the width of the permanent magnets 22a and 22b in the moving direction is to be compared with the length of the stator 1 (the armature) including the six slots of the tooth parts 11b and 12b, it is sufficient that this basic configuration is taken into consideration.

For example, when the number of tooth parts 11b and 12b facing 7n pieces of (magnets) is 6m (m is a natural number satisfying m≥n), comparison is performed on a 7-pole 6-slot configuration obtained by dividing the mover 2 into n pieces and the stator 1 into m pieces. That is, it is sufficient that when the length of the 7n/n=7 pieces of permanent magnets 22a and 22b in the moving direction is shorter by Pt1+Wt than the length of the stator including the 6m/m=6 pieces of tooth parts 11b and 12b and the auxiliary tooth parts 13b provided at both ends in the moving direction.

Further, when attention is focused on each of both end parts of the stator 1, it is sufficient that the total length of one auxiliary tooth 13b and six tooth parts 11b and 12b adjacent thereto (the length along the moving direction of the mover 2) is longer than the length of seven permanent magnets 22a and 22b by (Pt1+Wt)/2.

The following description is given for an allowable value of the amount of overhang in the linear motor 100 having the above-described configuration. Here, the overhang indicates that the tip of the mover 2 protrudes from the stator 1. The amount of overhang indicates the moving-directional length of the permanent magnets 22a and 22b of the mover 2 which are not facing the tooth parts 11b (12b) of the stator 1. When overhang occurs, since a part of the permanent magnets 22a and 22b of the mover 2 do not face the tooth parts 11b (12b), the thrust force decreases.

Figure 7A:
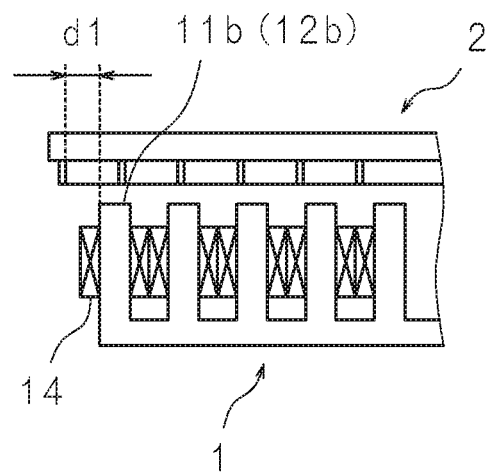
FIG. 7A is an explanation diagram illustrating the amount of overhang.
Figure 7B:
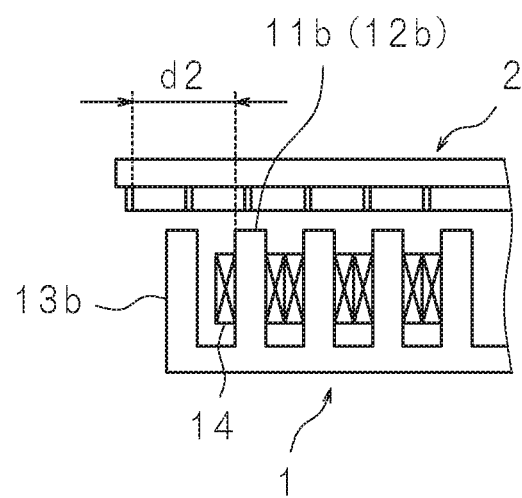
FIG. 7B is an explanation diagram illustrating the amount of overhang.

FIGS. 7A and 7B are explanation diagrams illustrating the amount of overhang. FIG. 7A illustrates the amount of overhang (d1) allowed in a case that the auxiliary tooth parts 13b are not provided. FIG. 7B illustrates the amount of overhang (d2) allowed in a case that the auxiliary tooth parts 13b are provided. Here, the allowable amount of overhang indicates a range where the thrust force is obtained in a magnitude almost similar to the normal value. As seen from comparison with FIGS. 7A and 7B, the allowable amount of overhang is extended by virtue of the auxiliary tooth part 13b. This is because when the auxiliary tooth part 13b is provided, a magnetic flux caused by a fringe effect is absorbed so that a pullback force (a force opposite to the thrust force) is reduced and hence a decrease in the thrust force does not occur.

As described above, the present embodiments provide the following effect. Since the auxiliary tooth parts 13b are provided in the stator 1, the effective stroke of the mover 2 is allowed to be extended without occurrence of a decrease in the thrust force.

Figure 8:
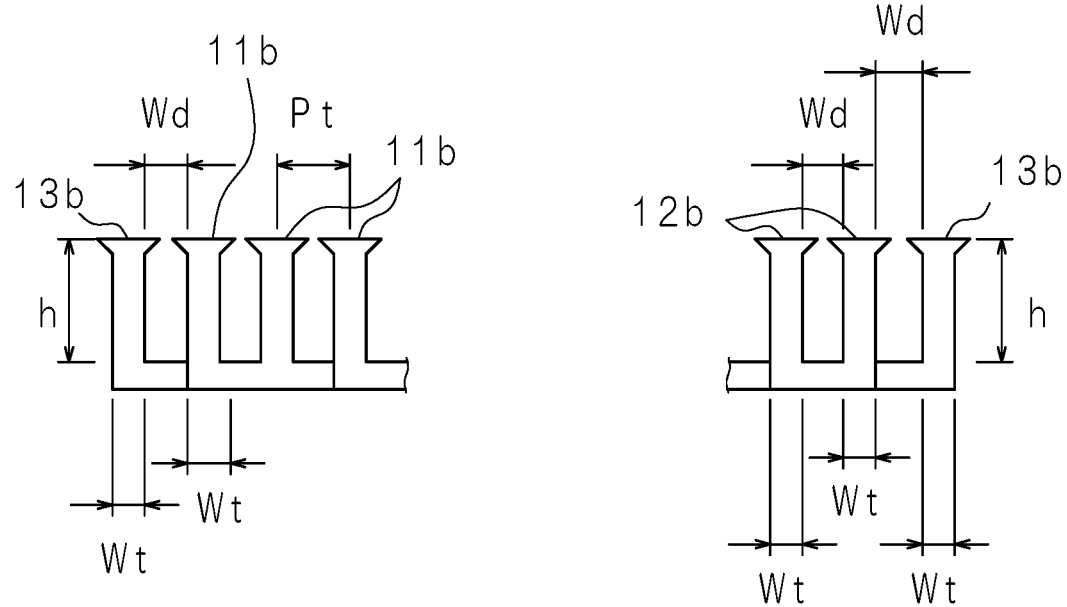
FIG. 8 is an explanation diagram illustrating another configuration of a stator without a coil.

Here, employable shapes of the tooth parts 11b and 12b are not limited to the above-described one. FIG. 8 is an explanation diagram illustrating another configuration of the stator 1 without the coil 14. FIG. 8 is a side view of the stator 1 similar to FIG. 2B. As illustrated in FIG. 8, an inverted taper shape is employed in which the height-directional upper tip (the tip part) of each of the tooth parts 11b and 12b of the magnetic pole tooth components 11 and 12 is thicker than the pedestal part of each of the board parts 11a and 12a. Further, similarly to the tooth part 11b and the tooth part 12b, also in the auxiliary tooth part 13b, the upper tip is formed in an inverted taper shape. When the height-directional upper tips of the tooth parts 11b and 12b are formed in an inverted taper shape, the magnetic flux transmission efficiency is allowed to be improved further.

Further, employable configurations of the stator 1 are not limited to the above-described one. That is, the board parts 11a, 12a, and 13a may be fabricated from a single plate and then the tooth parts 11b and 12b and the auxiliary tooth parts 13b may be fixed with screws or by welding. Alternatively, the tooth parts 11b and 12b and the auxiliary tooth parts 13b may be formed from a block-shaped material by machining.

Further, in the embodiments given above, the armature has been constructed as the stator 1 and the field magneton part has been constructed as the mover 2. Instead, the armature may be constructed as the mover and the field magneton part may be fixed.

It is to be noted that, as used herein and in the appended claims, the singular forms "a", "an", and "the" include plural referents unless the context clearly dictates otherwise.

The technical features (the constituent features) described in the individual embodiments may be combined together. Then, when they are combined together, a new technical feature may be formed.

The embodiments disclosed in the present specification are to be recognized as illustrative and not restrictive at all points. The scope of the present invention is to be specified by the claims not by the description given above and is intended to encompass all changes that depend on the spirit equivalent to that of the claims and that belong to the scope of the claims.

What is claimed is:

1. A linear motor comprising:
    a stator including a board part having a rectangular plate shape, a plurality of magnetic pole teeth which are juxtaposing to each other on the board part and around each of which a coil is wound, and an auxiliary tooth part which is arranged in each of both end parts of the board part in a juxtaposed direction in a manner of being separate from the plurality of magnetic pole teeth and around which a coil is not wound; and
    a mover including a plurality of magnets whose tip surfaces face the stator, and a back yoke having a rectangular plate shape in which the plurality of magnets are aligned in a straight line such that magnetic poles are alternately formed, wherein
    a 7n-pole 6m-slot configuration is employed in which the mover includes 7n pieces of the magnets (n is a natural number) and the stator includes 6m pieces of the plurality of magnetic pole teeth (m is a natural number satisfying m≥n) and in which 7 pieces of the magnets aligned adjacent to each other face 6 pieces of the magnetic pole teeth aligned adjacent to each other, and wherein
    in a case that a pitch of the plurality of magnetic pole teeth and the auxiliary tooth part is denoted by Pt1, that a length of each of the plurality of magnetic pole teeth and the auxiliary tooth part along a moving direction of the stator or mover is denoted by Wt, and that a skew angle of 7n pieces of the magnets is denoted by $\theta$,
    in a 7-pole 6-slot configuration obtained by dividing the mover into n pieces and by dividing the armature into m pieces, a length obtained by adding together the lengths of the two auxiliary teeth and 6 pieces of the magnetic pole teeth is longer by (Pt1+Wt) than a length of 7 pieces of the magnets in the moving direction,
    where Pt1=Pt/cos $\theta$ and
    Pt is the pitch of the plurality of magnetic pole teeth and the auxiliary tooth part in a case that the magnets are not skewed ($\theta$=0).

2. A linear motor comprising:
    a stator including a board part having a rectangular plate shape, a plurality of magnetic pole teeth which are juxtaposing to each other on the board part and around each of which a coil is wound, and an auxiliary tooth part which is arranged in each of both end parts of the board part in a juxtaposed direction in a manner of being separate from the plurality of magnetic pole teeth and around which a coil is not wound; and
    a mover provided with a plurality of magnets whose tip surfaces face the stator and with a back yoke having a rectangular plate shape in which the plurality of magnets are aligned in a straight line such that magnetic poles are alternately formed, wherein
    a 7n-pole 6m-slot configuration is employed in which the mover includes 7n pieces of the magnets (n is a natural number) and the stator includes 6m pieces of the plurality of magnetic pole teeth (m is a natural number satisfying m≥n) and in which 7 pieces of the magnets aligned adjacent to each other face 6 pieces of the magnetic pole teeth aligned adjacent to each other, and wherein
    in a case that a pitch of the plurality of magnetic pole teeth and the auxiliary tooth part is denoted by Pt1, that a length of each of the plurality of magnetic pole teeth and the auxiliary tooth part along a moving direction of the stator or the mover is denoted by Wt, and that a skew angle of 7n pieces of the magnets is denoted by $\theta$,
    a length in the moving direction obtained by adding together the one auxiliary tooth part and 6 pieces of the magnetic pole teeth adjacent to the auxiliary tooth part is longer than a length of 7 pieces of the magnets by (Pt1+Wt)/2,
    where Pt1=Pt/cos $\theta$ and
    Pt is the pitch of the plurality of magnetic pole teeth and the auxiliary tooth part in a case that the magnets are not skewed ($\theta$=0).

* * * * *